United States Patent [19]

Kang

[11] Patent Number: 5,468,940

[45] Date of Patent: Nov. 21, 1995

[54] MICROWAVE OVEN FOR SIMULTANEOUSLY COOKING TWO DISHES OF FOOD

[75] Inventor: Hyung J. Kang, Kwangmyung, Rep. of Korea

[73] Assignee: Goldstar Co., Ltd., Seoul, Rep. of Korea

[21] Appl. No.: 336,910

[22] Filed: Nov. 10, 1994

[30] Foreign Application Priority Data

Nov. 13, 1993 [KR] Rep. of Korea .................. 24123/1993

[51] Int. Cl.⁶ ........................................................ H05B 6/72
[52] U.S. Cl. ........................... 219/746; 219/751; 219/718; 219/763
[58] Field of Search ..................................... 219/746, 751, 219/718, 707, 697, 763

[56] References Cited

U.S. PATENT DOCUMENTS 2,909,635  10/1959  Haagensen .............................. 219/746
4,329,557   5/1982  Staats .................................... 219/746

FOREIGN PATENT DOCUMENTS 0037643  10/1981  European Pat. Off. ............... 219/746
1-255186  10/1989  Japan .................................... 219/746
3-129696   6/1991  Japan .................................... 219/746
3-133087   6/1991  Japan .................................... 219/746

*Primary Examiner*—Philip H. Leung
*Attorney, Agent, or Firm*—Finnegan, Henderson, Farabow, Garrett & Dunner

[57] ABSTRACT

A microwave oven is provided with a removable shelf for dividing a cavity into upper and lower heating zones. Microwave energy from a magnetron is selectively introduced into the upper and lower heating zones to controllably cook separate food items placed therein.

4 Claims, 6 Drawing Sheets

5,468,940

MICROWAVE OVEN FOR SIMULTANEOUSLY COOKING TWO DISHES OF FOOD

BACKGROUND OF THE INVENTION (1) Field of the Invention

The present invention relates to a microwave oven that may cook food items by means of microwave heating. More particularly, it relates to a microwave oven that can cook two kinds of food items simultaneously.

(2) Description of the Prior Art

As shown in FIG. 1, a conventional microwave oven comprises a chamber 23 forming a heating cavity 22 in a housing 21 having a magnetron 26 fixed by a bracket 27 to one side of the chamber 23 to generate microwave energy, a turn table 25 that is provided in the heating cavity 22 and is turned by a motor 24, and an inflow aperture 28 that is formed in the chamber 23 to admit microwave energy produced by the magnetron 26 into the heating cavity 22.

The conventional microwave oven has the following problems. A food item to be cooked is put on the turn table 25 in the cooking cavity 22 and the heating cavity 22 is then closed by a door 29. After power has been applied to the microwave oven in this condition, when a function selecting button provided in one side of the front surface of the housing 21 is selected, the motor 24 and the magnetron 26 are driven by a control signal of a micom. That is, the magnetron 26 produces microwave energy as turn table is turned by the motor 24.

The microwave energy produced from the magnetron 26, mounted by the bracket 27 to one exterior side of the chamber 23, flows into the heating cavity 22 through the inflow aperture 28 formed in the chamber 23. Therefore, the food item placed on the turn table 25 is cooked by microwave heating.

However, since the heating cavity 22 is just one cooking zone in the conventional microwave oven, when two kinds of food items are cooked, one is first cooked and the other is then cooked. The food item that was first cooked gets cold, while the second food item is being cooked. As a result, there is an inconvenience of reheating the food item first cooked.

In addition, cooking two food items in succession results in the increased consumption of cooking time and electric power.

SUMMARY OF THE INVENTION

The present invention is made in an effort to solve the above problems. It is an object of the present invention to provide a microwave oven having a heating cavity that may be divided into two zones according to the necessity to cook simultaneously two kinds of food items.

In order to achieve the above object, the inventive microwave oven comprises:

a cavity having a magnetron disposed to one side;

a shelf mounted detachably in the cavity and dividing the cavity into an upper heating zone and a lower heating zone; and a microwave dividing means selectively supplying microwave energy of the magnetron to the upper and lower heating zones.

BRIEF DESCRIPTION OF THE DRAWINGS

FIGS. 5A to 5C are sectional views as taken along lines C—C of FIG. 2, wherein

FIG. 5A is a view showing that microwave energy flows into upper and lower heating zones;

FIG. 5B is a view showing microwave energy flowing into only the upper heating zone;

FIG. 5C is a view showing microwave energy flowing into only the lower heating room.

DETAILED DESCRIPTION OF THE PREFERRED EMBODIMENT

A first preferred embodiment of this invention is now described with reference to the accompanying drawings.

Figure 3:
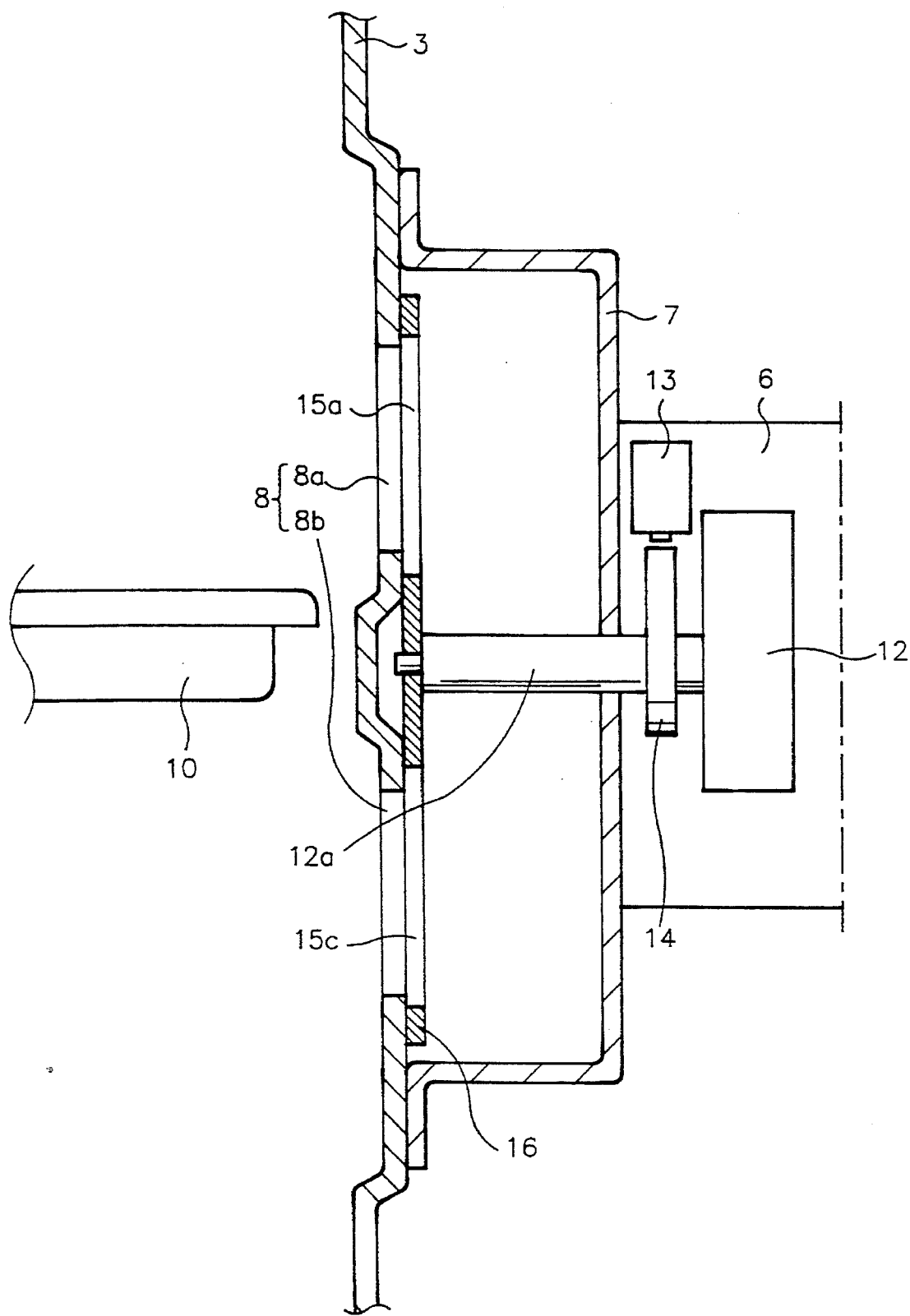
FIG. 3 is an enlarged view of "A" in FIG. 2.
Figure 4:
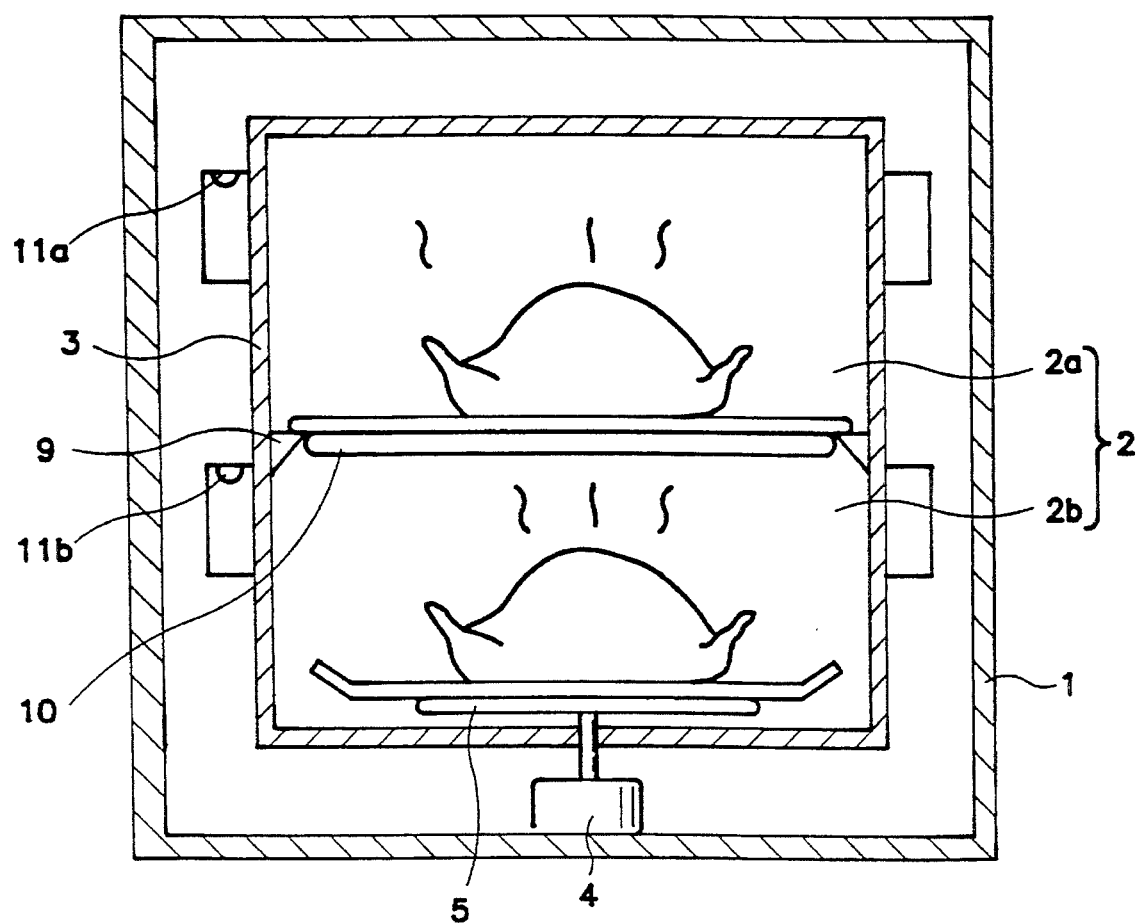
FIG. 4 is a sectional view as taken along lines B—B of FIG. 2.

The inventive microwave oven (FIG. 2) includes a shelf 10 mounted detachably inside a heating cavity 2 defined by a chamber 3 and dividing the heating cavity into an upper heating zone 2a and a lower heating zone 2b and a microwave-dividing means selectively supplying microwaves to the upper or lower heating zones 2a or 2b. The microwave-dividing means includes an upper sensor 11a and a lower sensor 11b (FIG. 4) that are disposed on an exterior side of the chamber 3 to sense a vapor or a gas; and a micom (not illustrated) for comparing and determining signals of the sensors; a step motor 12 (FIG. 3) that is fixed on a bracket 7 fixing a magnetron 6 to the chamber 3 to produce torque upon receipt of micom signals; a motor controlling means mounted by the bracket 7 on the same axis as the motor shaft 12a to transmit a rotating signal; and a microwave-inflow means formed with the chamber 3 and fixed to the motor shaft 12a to selectively admit the microwaves into the upper or lower heating zones 2a or 2b during the drive of the step motor 12.

The motor controlling means includes a cam 14 (FIGS. 3 and 6) that is fixed on the motor shaft 12a and a micro-switch 13 that is fixed on the bracket 7 and is turned on and off by the cam 14 to transmit a rotating signal of the step motor 12 to the micom.

The microwave-inflow means includes a rotating plate 16 (FIGS. 3 and 5a–5c) that is fixed on an end of the motor shaft 12a and includes first, second and third holes 15a, 15b and 15c (FIGS. 5a–5c) formed at 90° angular increments in the rotating plate 16, and upper and lower apertures 8a and 8b formed in the chamber 3 spaced 180° apart.

Supporting projections 9 are formed on side walls of the chamber 3 to support the shelf 10 in such a manner that the shelf may be removed from the heating chamber 3.

The operation and advantages of the present invention are now described as follows.

If only one food item is to be cooked, the shelf 10 is removed to form one heating cavity combining the upper and lower heating zones 2a and 2b. After that, the food is put on the turn table 5 in the heating cavity to be cooked in a conventional way.

If two different kinds of food items are to be cooked simultaneously, the heating cavity 2 is divided into upper heating zone 2a and lower heating zone 2b, the shelf 10 supported by projections 9 attached to side walls of the chamber 3. Two different items may then be cooked concurrently when respectively placed on the turn table 5 and on the shelf 10.

If one food item is cooked in heating cavity 2 or two different items are cooked simultaneously in the upper heating zone 2a and in the lower heating zone 2b by the micom should perceive either condition in advance.

Since the number of food items in the heating cavity 2 depends on the existence of the shelf 10, a light-sensor (not illustrated) is disposed in the heating cavity 2, and, if the light sensor senses that the shelf 10 is installed, the light sensor determines that the heating cavity 2 is divided into the upper and lower heating zones 2a and 2b.

If the micom does not sense that the shelf 10 is installed, the micom determines that the heating cavity contains just one food item.

The following is a detailed description of the above.

Figure 1:
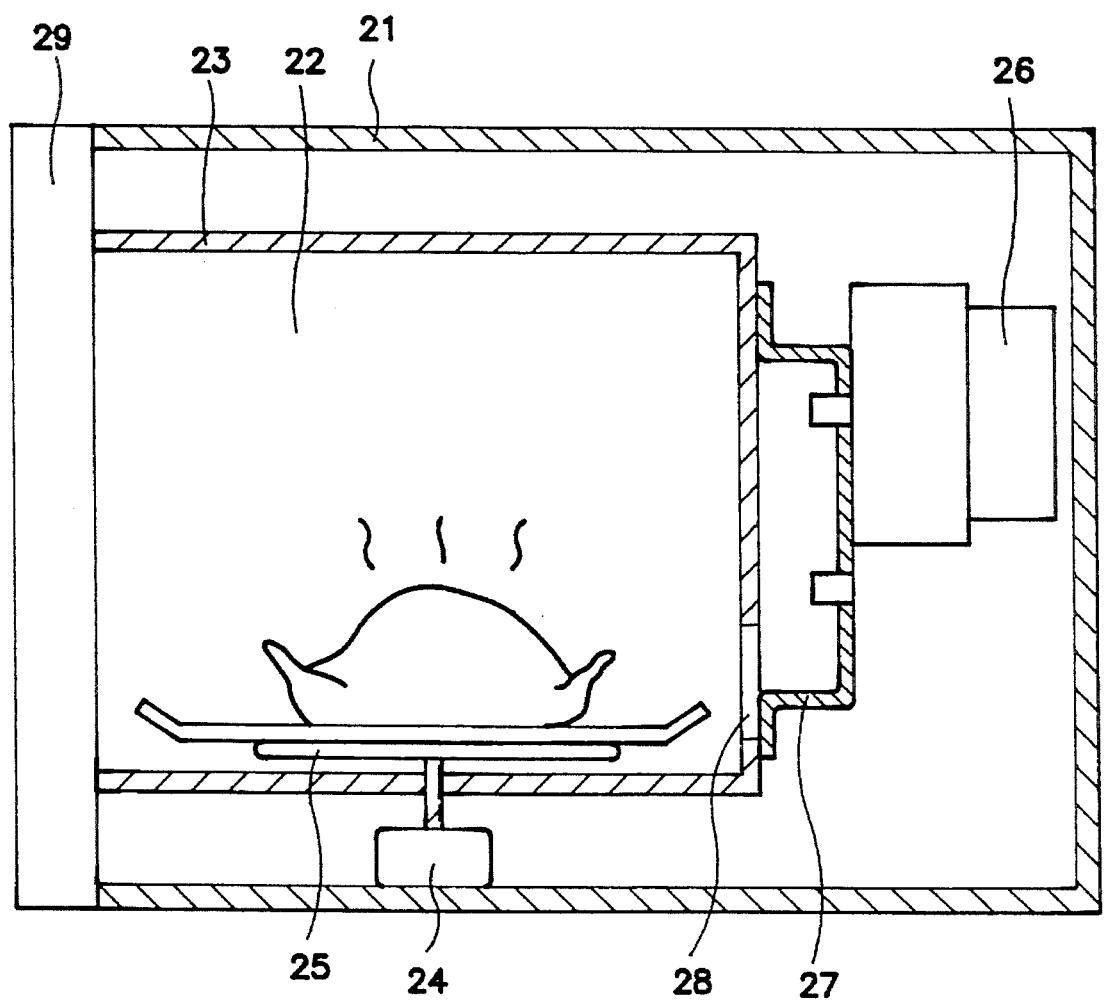
FIG. 1 is a longitudinal-sectional view showing schematically a conventional microwave oven.
Figure 2:
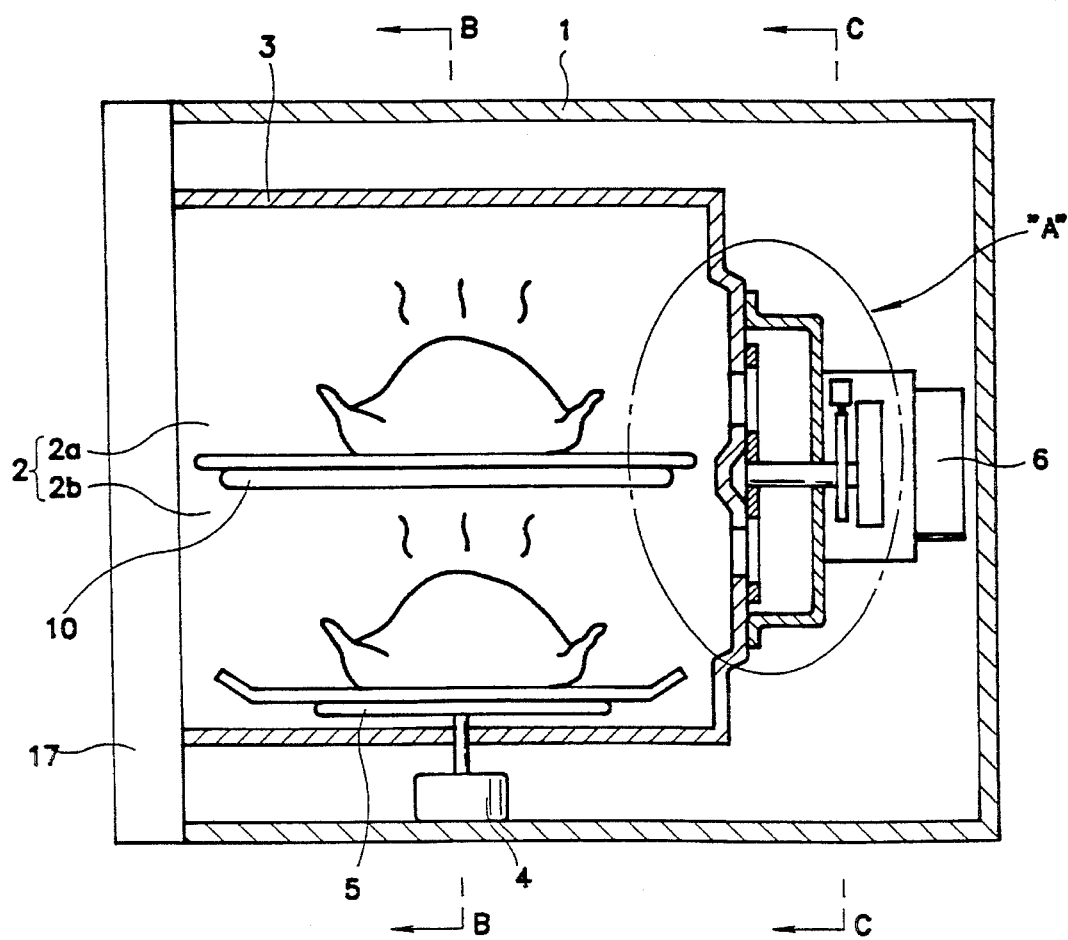
FIG. 2 is a longitudinal-sectional view showing schematically a microwave oven in accordance with the present invention.

One food item is put on the turn table 5, with the shelf being removed, and the heating cavity 2 is closed by the door 17. (FIG. 2)

When the oven is operated after the door 17 has been closed, the magnetron 6 fixed to an external surface of the chamber 3 by the bracket 7, produces microwave energy, and the motor 4 is driven to rotate the turn table 5 on which the food item is placed. The step motor 12, fixed on the bracket 7, is driven upon receipt of a signal of the micom to rotate the cam 14 and rotating plate 16 fixed on the motor shaft 12a.

When the cam 14 and rotating plate 16 rotate in such a manner, the cam 14 turns on the switch 13 fixed on the bracket 7. As the switch 13 is turned on, the micom stops the step motor 12.

Figure 5A:
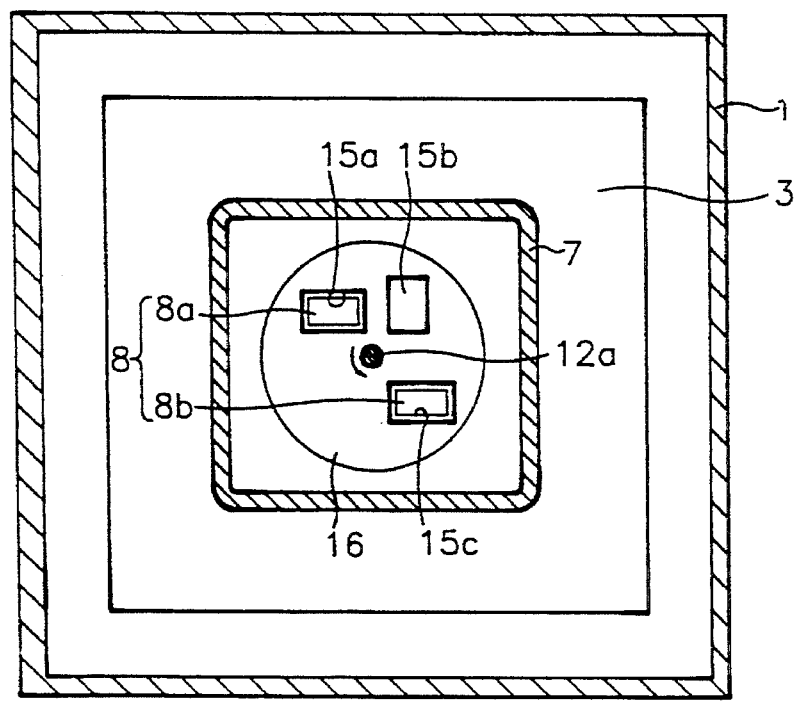

If the rotating plate 16 is stopped when the first and third holes 15a and 15c register with upper and lower inflow apertures 8a and 8b formed in the chamber 3 as seen in FIG. 5a, the microwaves produced from the magnetron 12 are admitted to the heating cavity 2 through the first and third holes 15a and 15c and the upper and lower inflow apertures 8a and 8b to cook the food item put on the table 5.

In the meantime, when the microwave oven is operated, the amount of the vapor and gas that are flowing out of the heating cavity 2 increases gradually, and this amount of the vapor and gas is sensed by a selected one of the upper and lower sensors 11a and 11b mounted on the other exterior side of the chamber 3.

If the signal of the one sensor is transmitted to the micom, the micom compares and determines this value with a predetermined value. If the value sensed by the one sensor is beyond the predetermined value, the cooking of the food is determined to be finished and the operation of the microwave oven stops.

The following description concerns the process of cooking two kinds of items simultaneously in the upper and lower heating zones 2a and 2b created from the one heating cavity 2 by the shelf 10.

In this occasion, one food item is put on the turn table 5 and the other food is put on the shelf, and the heating cavity 2 is closed by the door 17 to operate the microwave oven. Like the case when one food item is cooked, the microwaves produced from the magnetron 6 flows into the upper and lower heating zones 2a and 2b via the first and third holes 15a and 15c formed in the rotating plate 16 and via the upper and lower inflow holes 8a and 8b formed in the chamber 3 to cook the food item on the turn table 5 and the food item on the shelf 10 (FIG. 5a).

While the microwave oven is operated, the amount of the vapor and gas flowing out of the upper and lower heating zones 2a and 2b increases gradually as cooking of the food items progresses. The upper and lower sensors 11a and 11b sense the amount of the vapor and gas flowing out of the upper and lower heating zones 2a and 2b and then transmit resulting values to the micom. The micom compares the resulting values of the sensors 11a and 11b with a predetermined value. Since the food items in the upper heating zone 2a and the lower heating zone 2b are different in kind, the cooking-completion time is different in each case.

Figure 5B:
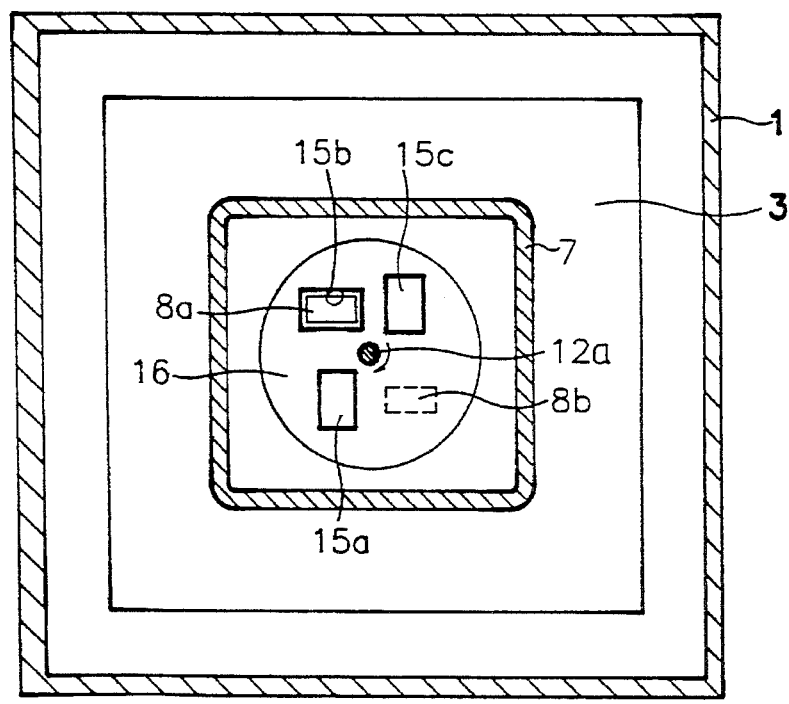

Accordingly, when the micom compares the resulting values of the sensors 11a and 11b with a predetermined value, the value of the upper sensor 11a may be beyond the predetermined value earlier than the value of the lower sensor 11b. That is to say, while the food item in the lower heating zone 2b is completely cooked, the food item in the upper heating zone 2a is not completely cooked. The lower inflow aperture 8b formed in the cavity 3 is closed in order that the microwaves do not flow into the lower heating zone 2b, as seen in FIG. 5b.

On the contrary, the value of the upper sensor 11a may be beyond the predetermined value earlier than the value of the lower sensor 11b. In this case, while the food item in the upper zone room 2a is completely cooked, the food in the lower heating zone 2b is not. Thus, the upper inflow aperture 8a formed in the chamber 3 is closed in order that the microwaves do not flow into the upper heating zone as seen FIG. 5c.

Figure 6:
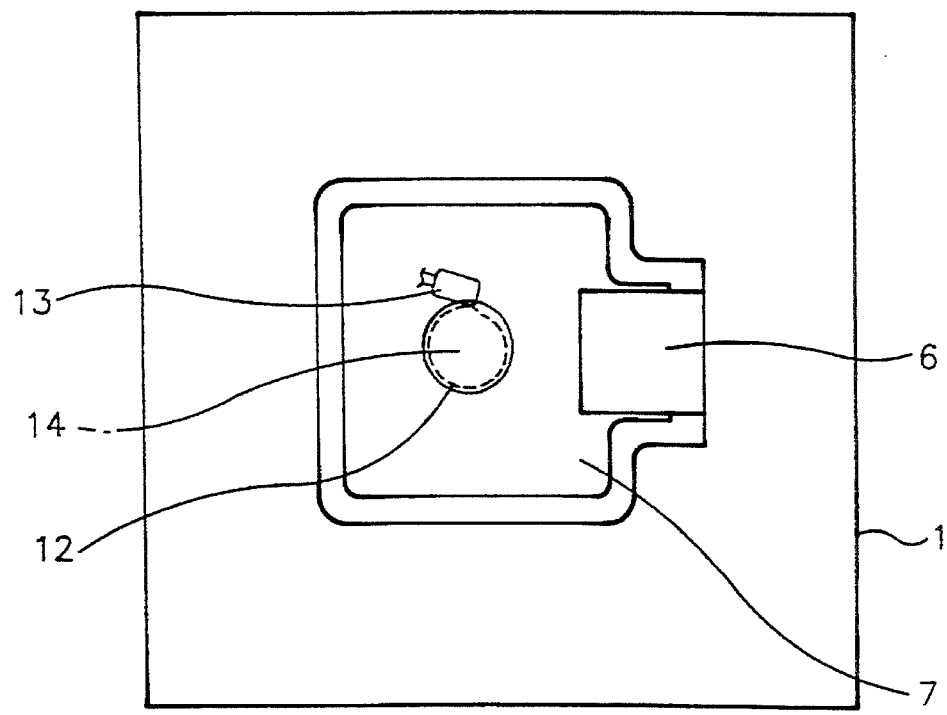
FIG. 6 is a rear view of the microwave oven in accordance with the present invention.

The condition that the microwaves flow into the heating zones 2a and 2b, is shown in FIG. 5A. Since the cam 14 is stopped in a position that the micro-switch 13 is turned on as shown in FIG. 6, the first and third apertures 15a and 15c among the first, second and third apertures 15a, 15b and 15c align with the upper and lower holes 8a and 8b formed on the chamber 3.

Accordingly, the upper and lower holes 8a and 8b are opened to cook the food items in the upper and lower heating zones 2a and 2b. As the food items in the upper and lower heating zones 2a and 2b are cooked, if the value of the lower sensor 11b is beyond a predetermined value earlier than the value of the upper sensor 11a, the micom controls the step motor 12 to rotate the cam 14 and the rotating plate 16 fixed on the motor shaft 12a 90° counterclockwise in the drawing and then stops the rotation of the rotating plate 16.

Then, the second hole 15b formed in the rotating plate 16 aligns with the upper inflow aperture 8a formed in the chamber 3 to open the upper inflow aperture, as shown in FIG. 5B. Since the microwaves produced from the magnetron 6 flow into only the upper heating zone 2a through the second hole 15b and the upper inflow aperture 8a, the food item in the upper heating zone is cooked continuously until the value of the upper sensor 11a is beyond the predetermined value.

The food cooked completely in the lower heating room 2b is warmed by the microwave energy flowing into the upper heating room 2a. If the value of the upper sensor 11a is beyond the predetermined value earlier than the value of the lower sensor 11b in FIG. 5A, the micom controls the step motor 12 to rotate the cam 14 and rotating plate 16 fixed on the motor shaft 12a by 90° clockwise in the drawings and then stops.

Figure 5C:
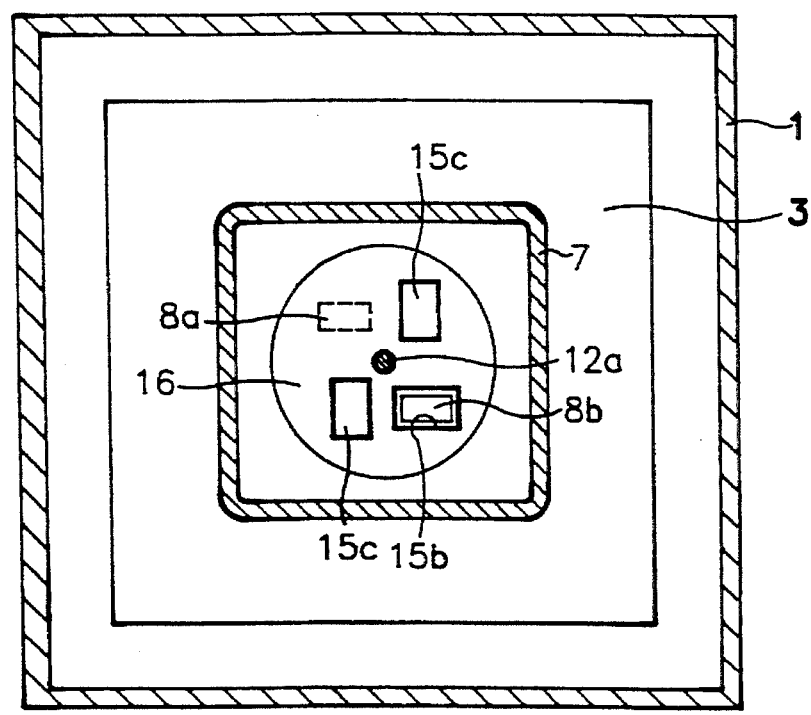

Since only the second hole 15b formed in the rotating plate 16, as shown in FIG. 5C, is aligned with the lower inflow aperture 8b formed in the chamber 3, just the lower inflow aperture is opened. Accordingly, the microwaves produced from the magnetron 6 flow into just the lower heating zone 2b via the second aperture 15b and the lower heating room is heated continuously until the value of the lower sensor 11b is beyond a predetermined value set by the micom. The food heated completely in the upper heating zone 2a may be kept warm under the influence of the microwaves flowing into the lower heating zone 2b.

Finally, the two food items may begin to be cooked simultaneously and yet completed at the same time.

It is convenient to use the inventive microwave oven to cook two different kinds of food items simultaneously, which may reduce electric power consumption as compared to a conventional microwave oven.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A microwave oven comprising:

a cavity having a magnetron provided at one side of the cavity;

a shelf mounted detachably in said cavity, said shelf dividing said cavity into an upper heating zone and a lower heating zone; and an upper sensor and a lower sensor mounted to said cavity in positions corresponding to said upper and lower heating zones, said upper and lower sensors sensing the vapor or gas output from the upper and lower heating zones respectively;

means for comparing and determining signals from said upper and lower sensors to provide an output signal;

a step motor, adjacent to the magnetron, for generating torque on a motor shaft upon receipt of a controlling signal;

a motor controlling means for applying the controlling signal to the step motor in response to the output signal from the comparing and determining means; and a microwave inflow means driven by the motor shaft for selectively controlling flow of microwave energy into the upper and lower heating zones according to a rotation direction and rotation angle of the motor shaft.

2. The microwave oven according to claim 1, further comprising supports provided on inner side walls of the cavity for detachably mounting the shelf.

3. The microwave oven according to claim 1, wherein the motor controlling means includes:

a cam fixed on the motor shaft; and a micro-switch fixed on one side wall of the cavity and turned on or turned off in response to rotation of the cam to produce the controlling signal.

4. The microwave oven according to claim 1, wherein said microwave inflow means includes:

a rotating plate fixed to the motor shaft;

first, second and third angularly paced holes formed in the rotating plate; and upper and lower cavity openings into the upper and lower heating zones, said first, second and third holes being selectively aligned with the upper and lower cavity openings during the rotation of the rotating plate.

* * * * *